(12) United States Patent
Clediere (10) Patent No.: US 11,216,585 B1
(45) Date of Patent: Jan. 4, 2022

(54) USER INTERFACE FOR PRIVATE INTERACTIONS BY USERS

(71) Applicant: Facebook, Inc., Menlo Park, CA (US)

(72) Inventor: Robin Maxime Clediere, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 419 days.

(21) Appl. No.: 16/183,742

(22) Filed: Nov. 8, 2018

(51) Int. Cl.
*G06F 21/62* (2013.01)
*H04L 29/06* (2006.01)
*G06F 9/451* (2018.01)
*G06F 3/0481* (2013.01)

(52) U.S. Cl.
CPC .......... *G06F 21/6245* (2013.01); *G06F 9/451* (2018.02); *H04L 63/10* (2013.01); *G06F 3/0481* (2013.01)

(58) Field of Classification Search
CPC .... G06F 21/6245; G06F 9/451; G06F 3/0481; H04L 63/10
See application file for complete search history.

(56) References Cited

U.S. PATENT DOCUMENTS

| | | | | |
|---|---|---|---|---|
| 2013/0227431 A1* | 8/2013 | Vasudevan | ............... | G06F 9/451 715/753 |
| 2013/0295872 A1* | 11/2013 | Guday | .................... | H04W 4/90 455/404.1 |
| 2014/0344745 A1* | 11/2014 | Possing | ................ | G06Q 10/109 715/772 |
| 2015/0304369 A1* | 10/2015 | Sandholm | ............... | H04W 4/21 715/753 |
| 2016/0191654 A1* | 6/2016 | Healey | .................. | H04L 67/303 709/228 |
| 2017/0098097 A1* | 4/2017 | Van Eerd | .............. | H04W 8/183 |
| 2020/0012423 A1* | 1/2020 | Cinek | ................. | H04M 19/048 |

* cited by examiner

*Primary Examiner* — Robert B Leung
*Assistant Examiner* — Bruce S Ashley
(74) *Attorney, Agent, or Firm* — Fenwick & West LLP (57) ABSTRACT

A social application provides a user interface that allows private or non-public interactions by users in a relationship (e.g., a dating or family relationship), which acts as a "private space" for those users. The private space can be created behind a main interface of a social application so that it is easily accessible by swiping away or otherwise revealing the private interface. Users can easily return to the main interface, such that a user can flip back and forth between private and more public environments. The private space can include user interfaces accessible via tabs or links, such as a homepage interface, a chat interface, a photos interface, and a dates interface that together allow users to communicate privately, share photos and important dates. One user can also receive notifications in either the main or private interfaces that notify the user of the other user's actions in either interface.

20 Claims, 9 Drawing Sheets

USER INTERFACE FOR PRIVATE INTERACTIONS BY USERS

BACKGROUND

This disclosure relates generally to social networking systems, and in particular to presenting a user interface for private interactions by users of a social application.

Social applications allow users to connect and interact with each other. In particular, many social applications allow users to interact with each other on publicly-available content items generated by users of the social application. For example, users can interact with each other by interacting with and creating content (e.g., "commenting" on a post, "tagging" another user in a content item, and posting content items to the profiles of other users). Here, interactions are publicly displayed to other users of the social application through a main user interface on the social application. Users can also interact privately with each other in separate interfaces (e.g., private messaging interfaces). However, these separate interfaces often have fewer features than the main user interface and are not easily accessible from other interfaces of the social application.

As a result, there are few opportunities for one-on-one interactions between users through a social application. Therefore, it can be difficult for users in a special and distinct relationship to interact with each other on a social application. This is a particularly prevalent issue when users attempt to interact with significant others, family members, or close friends on the social application. Furthermore, as the number of users on a social application increases, it becomes increasingly less likely that a user will be notified when a particular user interacts with the social application. Thus, users may not see interactions that would be of particular interest to them (e.g., an interaction between a significant other and a content item, a message from a significant other, and the like). In addition, a user may not see such an interaction until long after the interaction occurred, thereby preventing direct and immediate communication between users in a relationship.

SUMMARY

A social application or social networking system provides a user interface that allows private or non-public interactions between users, which acts as a "private space" for those users. Private spaces are created when users are in designated relationships with one or more users of the social application. Relationships between users can include romantic relationships, familial relationships, and platonic relationships. The private space can be limited so content is only visible to users with access to the private space. The private space can be created behind a main interface or first interface of the social application so that it is easily accessible by swiping away or otherwise causing the system to move the first interface to reveal the private interface. Similarly, the users can easily return to the first interface, such that a user can flip back and forth between private and more public environments.

There can be various triggers for creating a private space for users. For example, once two or more users indicate that they are in a designated relationship, the social application can automatically generate a private space for the two or more users or can send a notification offering to create such a private space. As another example, a user can request creation of a private space or can access a creation interface via which the user can initiate creation of a private space. In example embodiments, users are notified that the private space is created via a banner notification or a message from the social application.

The private space can include two or more user interfaces accessible via tabs or links in the private space that provide various different types of interaction functionality to the users. In some embodiments, user interfaces can include a homepage interface, a chat interface, a photos interface, and a dates interface. The homepage interface is an interface in which users with access to the private space can directly communicate with one another (e.g., phone calling and video calling). The homepage interface can also provide users with reminders of upcoming events associated with the two or more users of the private space. The chat interface is another interface in which users can directly communicate. In some embodiments, users can send text messages, photo messages, and schedule events. The photos interface is an interface that displays photos associated with the users of the private space. In an example embodiment, users can upload and organize photos into albums in the photos interface. The dates interface is an interface in which users can create and view upcoming events and dates associated with the users of the private space. In one example, users are reminded of upcoming trips, holidays, and anniversaries.

Users can also receive notifications in the private space or in the main interface of the social application about interactions of other private space users. When one of the private space users interacts with the main interface in the social application while the other user of the private space is using the private space, the other user can get a notification of that interaction while in the private space. Similarly, if one of the private space users interacts with the private space interface while the other of the private space users is on the main interface, the other user can get a notification of that, as well. Additionally, the notification can redirect the user to the location where the other user just had the interaction.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
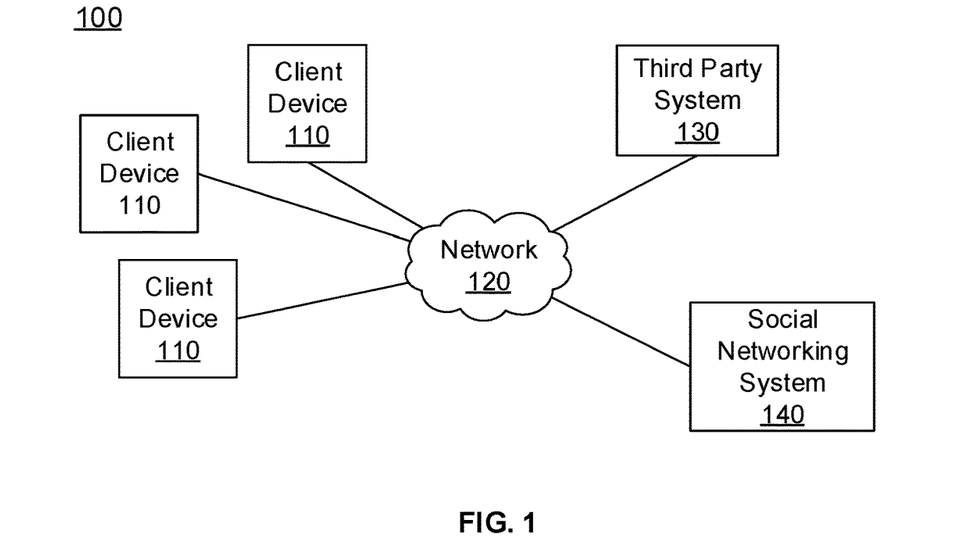
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. For example, the system 140 is a content sharing network, or another online or other system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
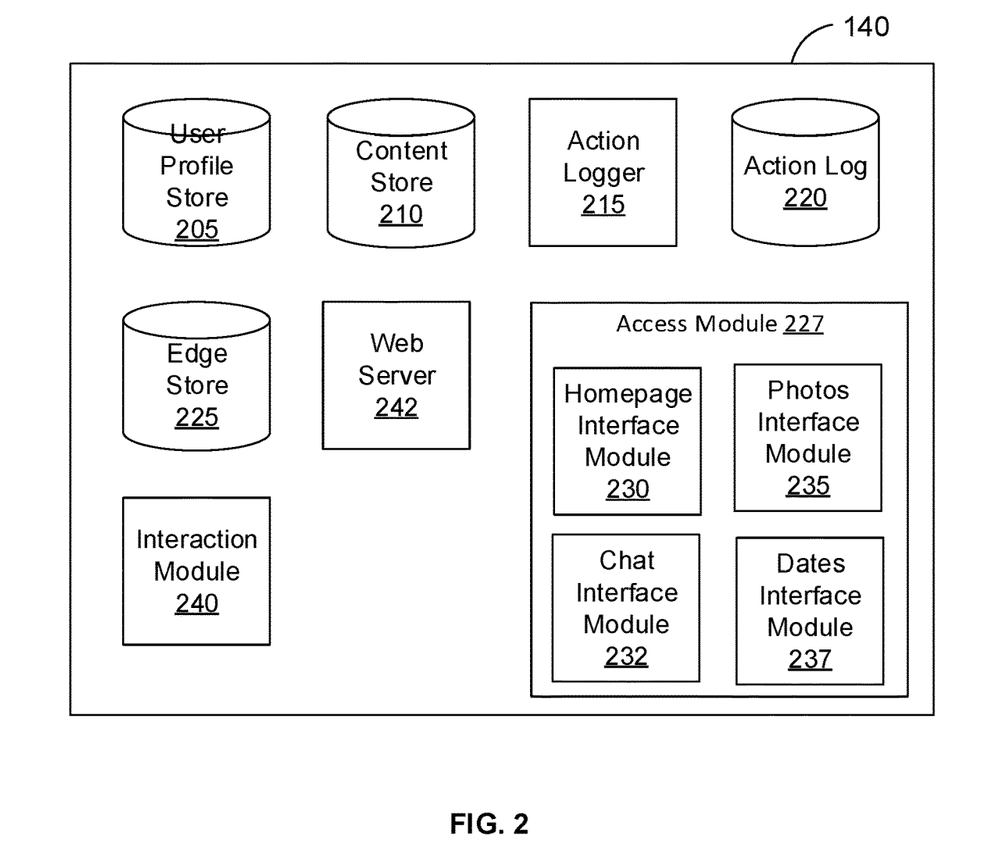
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, an access module 227 (containing a homepage interface module 230, a chat interface module 232, a photos interface module 235, and a dates interface module 237), an interaction module 240, and a web server 242. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the social networking system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate the user's interest in an object, in a topic, or in another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users. The access module 227 shown in FIG. 2 includes a homepage interface module 230, a chat interface module 232, a photos interface module 235, and a dates interface module 237. In other embodiments, the access module 227 may include additional, fewer, or different components for various applications. Conventional components such as security functions, load balancers, failover servers, and the like are not shown so as to not obscure the details of the system architecture. Where the private space includes other interfaces, there may be other modules for each, but FIG. 2 provides one example of a possible configuration.

The access module provides a method for accessing a user interface or private space created for two or more users. This space allows the two (or more) users to interact privately with each other without sharing their interactions with a broader user base or with their other connections within a social network. The private space is accessed from behind a main or first user interface of a social application or other application. Examples of a first user interface include a newsfeed, a messaging interface, a user profile page, and the like. Since this private space sits right behind a main interface of an application, it is easily accessed by users such that they can flip or swap between the two interfaces quickly to view and interact with both interfaces. A user can interact on the main interface with all of the user's connections in a social network, but then can quickly access the private space to send a message or add photo visible only to the user's significant other that shares the private space. The private space can provide all or most of the functionality provided in the main interface of the social application so that users have this, but within the private area.

The private space can be created in various ways. In one embodiment, the private space is created when a first user and a second user indicate that they are in a relationship with each other or are otherwise connected. Examples of relationships that would induce the creation of a private space include romantic relationships, platonic relationships, and familial relationships. For example, one user may change his or her status in a social application to "dating" another user, and the system can automatically create the private space or provide a notification to one or both users offering them an option to decide to create the space. Either user can also request to create a space with another user (the other user's approval may be required). For example, one or both users can send a request to the system to create the private space, can navigate to or access a creation interface that allows for creation of the private space, among other methods.

The homepage interface module 230 collects and displays information from one or more interfaces in the private space and from the first interface in the social application. The homepage interface module 230 also facilitates communication with the two or more users associated with the private space. Examples include facilitating phone calls, video messaging, and other direct forms of communication between two or more client devices 110. In one embodiment, the homepage interface module collects information from the chat interface module 232, the photos interface module 235, and the dates interface module 237, and displays the information in the homepage interface. The homepage interface module 230 sends interactions between a user and the homepage interface to the interaction module 240. An example homepage interface is described in more detail with regard to FIG. 5.

The chat interface module 232 is a module that facilitates communication between the two or more users associated with the private space. These can be private chats between these users that are accessible only to these users. In one embodiment, the chat interface module 232 enable users to send messages, upload photos, and create calendar events. The chat interface module 232 sends interactions between a user and the chat interface to the interaction module 240. The chat interface module 232 directs information related to photos to the photos interface module 235, and directs information related to dates and events to the dates interface module 237. Interactions between users of the private space with the chat interface module 232 are sent to the interaction module 240. An example chat interface is described in more detail with regard to FIG. 6.

The photos interface module 235 is a module that stores and displays photos associated with the two or more users. In one embodiment, the photos interface module 235 collects and stores photos from the user profiles of the two or more users or from the social application or another messaging application, and displays them in the photos interface. In another embodiment, the photos interface module stores and displays photos directly uploaded to the chat interface or the photos interface. The photos interface module 235 sends interactions between a user and the photos interface to the interaction module 240. An example homepage interface is described in more detail with regard to FIG. 7.

The dates interface module 237 is an interface module that stores and displays events and dates associated with the two or more users associated with the private space. In one embodiment, the date interface module 237 collects events associated with the two or more users from the first interface of the social application and displays the events in the dates interface. In another embodiment, the dates interface module 237 stores and displays events created directly in the chat interface and in the dates interface. The dates interface module 237 sends interactions between a user and the dates interface to the interaction module 240. An example dates interface is described in more detail with regard to FIG. 8

The interaction module 240 stores all of the interactions between the two or more users with access to the private space or interactions of those users with the private space. The interaction module 240 also stores all interactions between the first user interface of the social application and the two or more users with access to the private space. When a first user interacts with the private space, the interaction module 240 notifies the other users with access to the private space of the interaction. Examples include sending messages, uploading photos, and creating events within the private space. Additionally, when a first user interacts with the first interface of the social application, the interaction module 240 notifies the one or more users with access to the private space of the interaction inside the private space. Examples include posting content items to a news feed, responding to events hosted by another user, following an entity page, etc.

The web server 242 links the social networking system 140 via the network 120 to the one or more client devices 110, as well as to the one or more third party systems 130. The web server 242 serves web pages, as well as other content, such as JAVA®, FLASH®, XML and so forth. The web server 242 may receive and route messages between the social networking system 140 and the client device 110, for example, instant messages, queued messages (e.g., email), text messages, short message service (SMS) messages, or messages sent using any other suitable messaging technique. A user may send a request to the web server 242 to upload information (e.g., images or videos) that are stored in the content store 210. Additionally, the web server 242 may provide application programming interface (API) functionality to send data directly to native client device operating systems, such as IOS®, ANDROID™, or BlackberryOS.

Creating and Accessing Private Space

Figure 3:
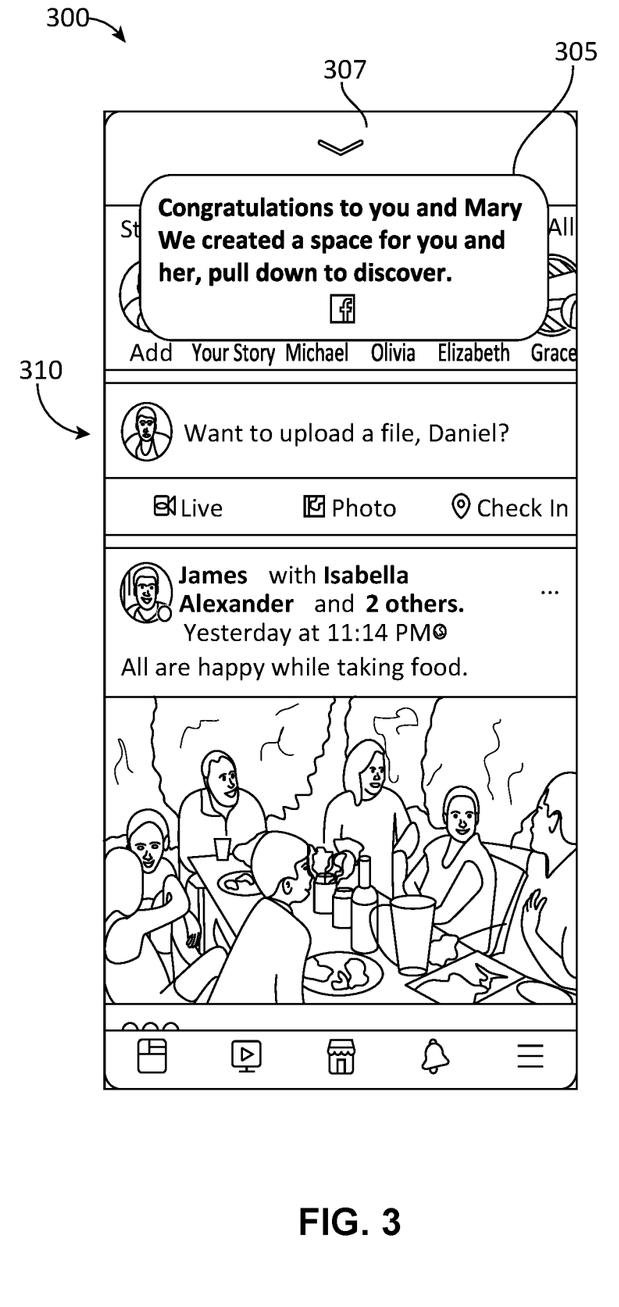
FIG. 3 illustrates an example interface showing a notification indicating a private space has been generated, according to one embodiment.

FIG. 3 illustrates a notification 305 on the social application 300 generated by the social networking system 140 indicating that a private space has been created for two or more users from a plurality of users on the social application. The social application generates the private space upon a trigger action from the two or more users. As explained above, a private space can be generated when a first and second user indicate they are in a relationship with each other, when they request creation of a private space, when they access a private space creation interfaces, among other ways. Regardless of how the space is created, the system can provide a notification 305 to one or more users who share the private space. The notification can appear on or in relation to the social application. For example, it could appear as a banner at the top of or somewhere on the social application, it can appear as a message or email, it can be provided in a newsfeed story, as a notification icon in a notifications location of a social application, among other ways.

The system can create the private space and automatically populate it with certain content that the users can modify or supplement. For example, the system can automatically select a homepage photo and certain default controls on homepage interface that the user can then customize. The system can pre-populate photos of the users in the private space into a photos interface, can pre-populate dates shared by users of the private space into the dates interface, among other customizations to the users. The users can then further customize the look and design of the space, and may even select which interfaces to include, what controls will be available in each, etc.

When the private space is created, users can click on the notification 305 to access it, or there can be other ways for access. In one embodiment, when the private space is created, an access element 307 will appear on the first interface 310 of the social application. Users can then access the private space from the first user interface 310 through the access element 307. The access element 307 can also be visible within the private space and used to access the first user interface 310 from the private space.

Figure 4:
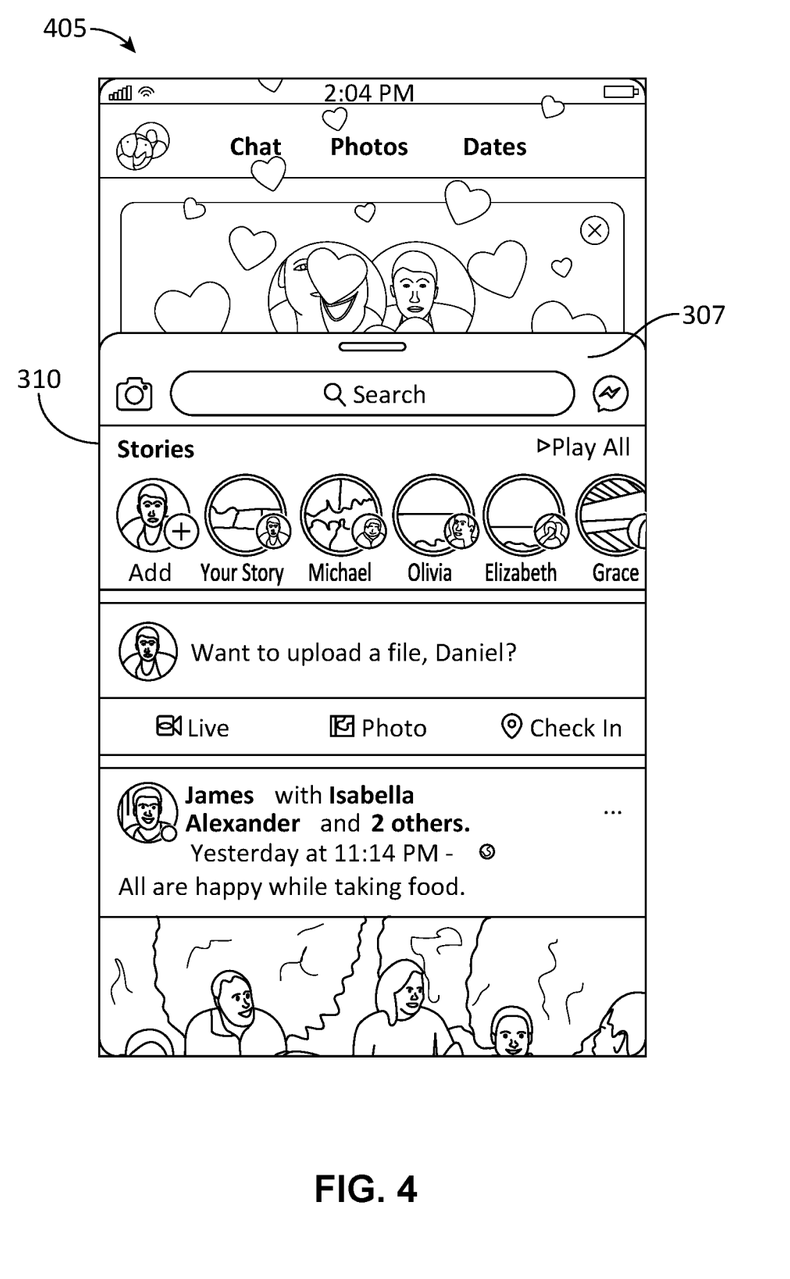
FIG. 4 illustrates an example interface showing accessing of a private space, according to one embodiment.

FIG. 4 illustrates a method of accessing the private space 405 with the access element 307. The private space 405 is displayed behind the first user interface 310 of the social application. In one embodiment, users swipe the access element 307 down to access the private space. In this example, the first user interface 310 is like a screen that can be moved up and down to reveal or hide the private space 405, making the private space very easy to access while using the first interface. In other embodiments, users may swipe the access element 307 to the left or right, tap the access element 307, or swipe the access element 307 up to hide the first user interface 310 and reveal the private space 405. In one embodiment, the access element 307 is a bar that is present at the top of the first user interface when users interact with the first user interface, and is a bar that is present at the bottom of the private space when users interact with the private space. Other embodiments, the access element 307 is a radio button, a switch, an icon, etc. Thus, there can be various ways of accessing the private space 405 from behind the first user interface 310, including any way to collapse or move away the first interface 310 so the private space 405 is revealed.

While the private space 405 is shown as being behind the first user interface 310, and the first user interface 310 is hidden upon access of the private space 405, there are alternative designs, as well. The two interfaces 310, 405 could be shown side-by-side or above and below each other, one could be shown as a thumbnail on the other, etc. Instead of one interface being on top of the other, the two interfaces could simply flip places back and forth or either can collapse or move away to reveal the other. In each of these options, both interfaces are readily accessible to the users.

Example Private Space Interfaces

Within the private space, there can be various interfaces that allow the users to interact. Some example interfaces are illustrated and described below.

Figure 5:
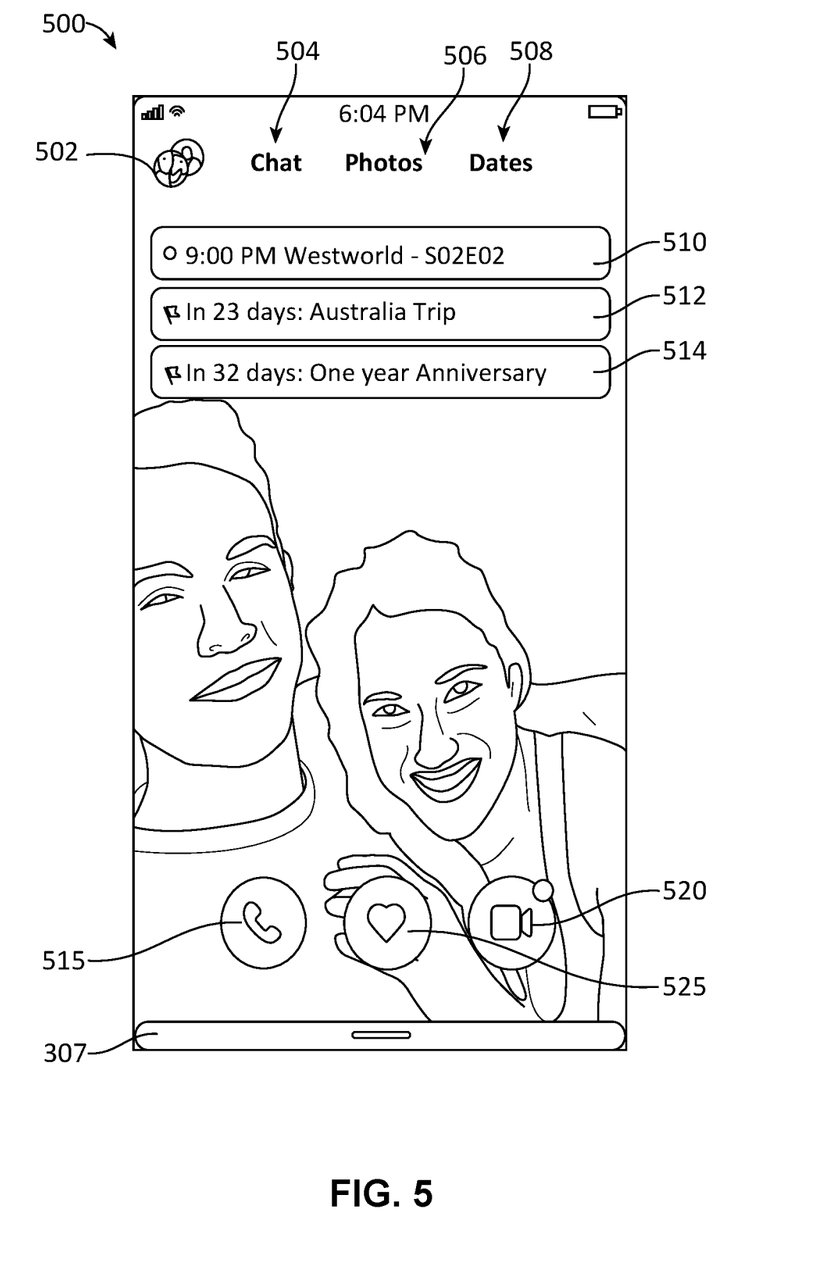
FIG. 5 illustrates an example homepage interface in the private space, according to one embodiment.

FIG. 5 illustrates one embodiment of the homepage interface 500 of the private space 405. The homepage interface provides users access to the other interfaces within the private space. In example embodiments, users can access the chat interface from within the private space 405 with the chat interface access element 504, the photos interface with the photos interface element 506, and the dates interface with the dates interface access element 508. Users access the homepage interface from the first user interface 310 through the access element 307 and from the private space 405 with the homepage interface access element 502.

In one embodiment, the homepage interface 502 displays upcoming calendar events 510 and important events 512 or dates 514. Examples of upcoming calendar events 510 include events created in the chat interface or dates interface, and events from an entity page in the first user interface 310 that users with access to the private space follow (e.g., concerts, TV show airings, and parties). Examples of important events 512 and dates 514 include upcoming trips, anniversaries, and milestones for the users of the private space.

The homepage interface 500 displays a plurality of methods in which can communicate with one another. Communication access elements, e.g., 515, 520, and 525, facilitate fast and easy communication between users of the private space. In some embodiments, communication access elements include an access element for phone calls 515, video calls 520, and indicating affection 525. By selecting phone call element 515 or video call element 520, one of the users can directly phone call or video call the other user from within the private space. By selecting the affection element 525, the system will send some sort of affection from one user to the other. For example, this could send a heart, a kiss, or other emoji as a message in a chat interface (in the private space or in another social application messaging interface), as a notification that appears in a banner or as an icon on a homepage of the private space, as a notification in the first interface 310 of the social application, etc.

The homepage interface 500 can display a photo of the users in the private space that is selected by one or both users or selected as a default by the system. For example, the system can search all photos stored by the users within the social application for photos that depict both or all users of the private space. This can include photos posted by either user where that user has tagged the other user. This can also include performing facial recognition by the system on the photos to detect photos that show faces that match profile images that the system has stored for each user.

In addition, the system can also display the actual profile photos of the two users on the homepage interface or on all interfaces as a connected profile photo or homepage interface access element 502. The user can navigate back to the homepage by clicking this on any of the private space interfaces. In the connected profile photo, the profile images are merged in some way, or shown as two bubbles that are connected to uniquely indicate that this is a private space in which those users are specially connected.

Figure 6:
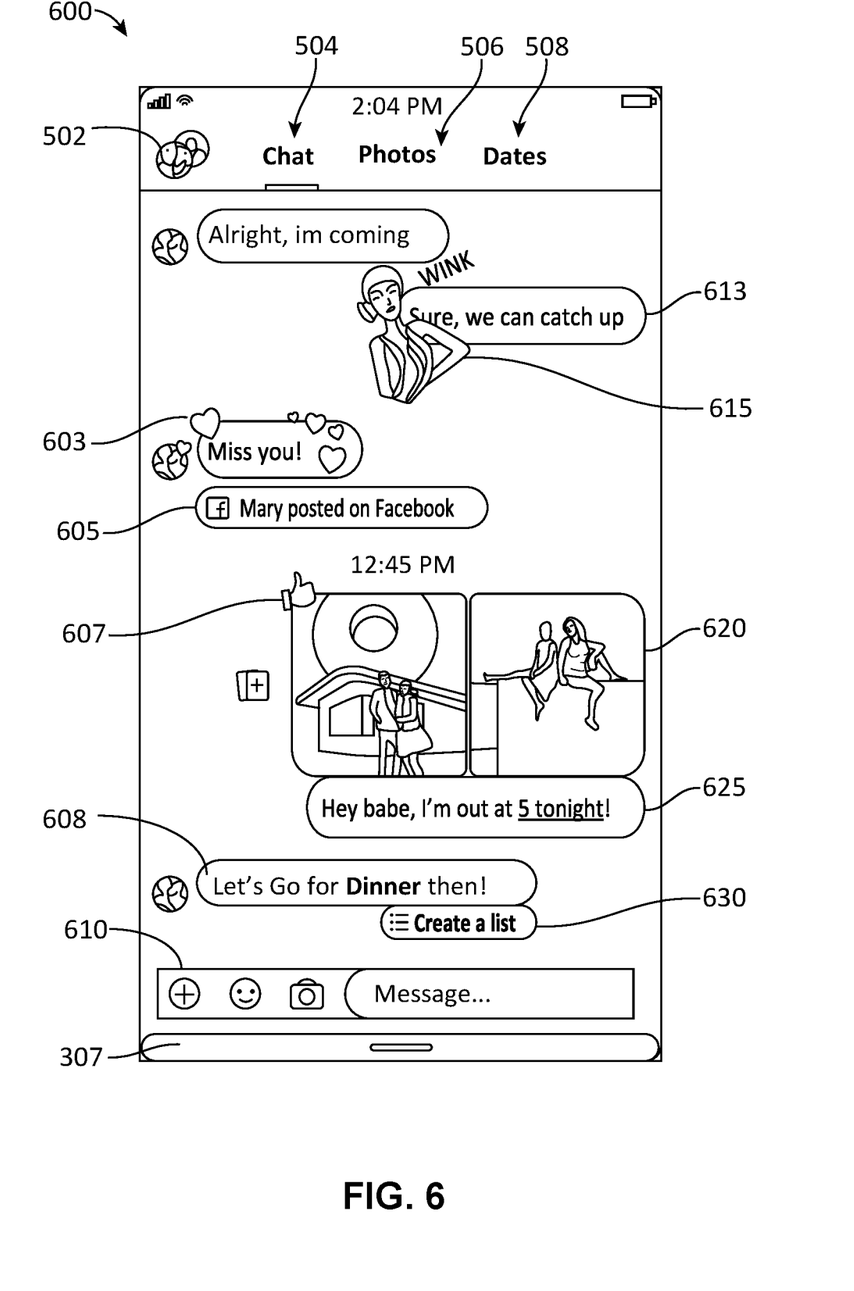
FIG. 6 illustrates an example chat interface in the private space, according to one embodiment.

FIG. 6 illustrates one embodiment of the chat interface 600. The chat interface 600 is an interface in which the first and second users communicate. In one embodiment, users use a communication bar 610 to facilitate interaction in which the user can type a message into the "message" bubble or can select one of the icons to send photos or reactions/emojis/stickers. Examples of communication with the communication bar 610 include sending text messages 613, image messages 620 (using the camera icon), emotions (using the smiley face icon), and other message types (using the plus sign icon to expand the list of options in the bar 610).

In the chat interface 600, the first user can be notified 605 when the user sharing the private space posts one or more content items to the first user interface 310. For example, the user's significant other with whom the user shares the private space might post a new photo on the main or first interface in the social application. In one embodiment, users can select the notification 605 and are directed to the posted content item in the first user interface 310. In other embodiments, users are notified within the chat interface 600 when users interact with the other interfaces in the private space 405. Examples include posting images to the photos interface, creating an event in the dates interface, and sending a call through the homepage interface.

Users can indicate a preference for messages in the chat interface 600. Users can indicate a preference for messages they post and messages posted by other users of the private space. Users can indicate preference 607 by direct interaction with a posted message, also referred to as reacting to the message. Examples include a user interacting with posted messages by "liking" the message, "loving" the message, or commenting on the message. Users can also indicate a preference 615 when posting a message 613. In one embodiment, users use the communication bar 610 to indicate preference when posting a content item by selecting a sticker or icon to be posted next to the content item. Examples include sending a post with an emotion 603, such as a love or heart emotion, sending a "wink" with a post 615, and the like.

Users can upload photos to the private space 405 through the chat interface 600. In one embodiment, users can upload photos through the communication bar 610. In another embodiment, users add photos to a posted message that already includes one or more photos 620. Photos added to the chat interface 600 are collected by the photos interface module 235 and displayed in the photos interface, described in detail in FIG. 7.

Messages posted in the chat interface 600 are modified depending on the context of message. In one embodiment, messages associated with a date or time 625 are modified so that users can create calendar events. Calendar events created in the chat interface can be collected and displayed in the dates interface by the dates interface module 237. For example, the message 608 that refers to going to dinner could result in the system automatically creating a dinner tonight item in the calendar for the users in the private space, or asking the user whether the user would like to create such a calendar item. The user can then add the item and customize it (e.g., list the time and location for dinner, list restaurant options, etc.). In another embodiment, messages associated with an event 608 are modified to enable users to create a list 630 associated with the event. Examples include grocery lists, packing lists, and trip itineraries. For example, the message 608 could result in the system automatically creating (or asking one or both users if they would like to create) a grocery list for dinner to which both users can add items. Either user can then add food items to the grocery list. The list 630 associated with the event can be collected and displayed in the dates interface, described in detail in FIG. 8.

Figure 7:
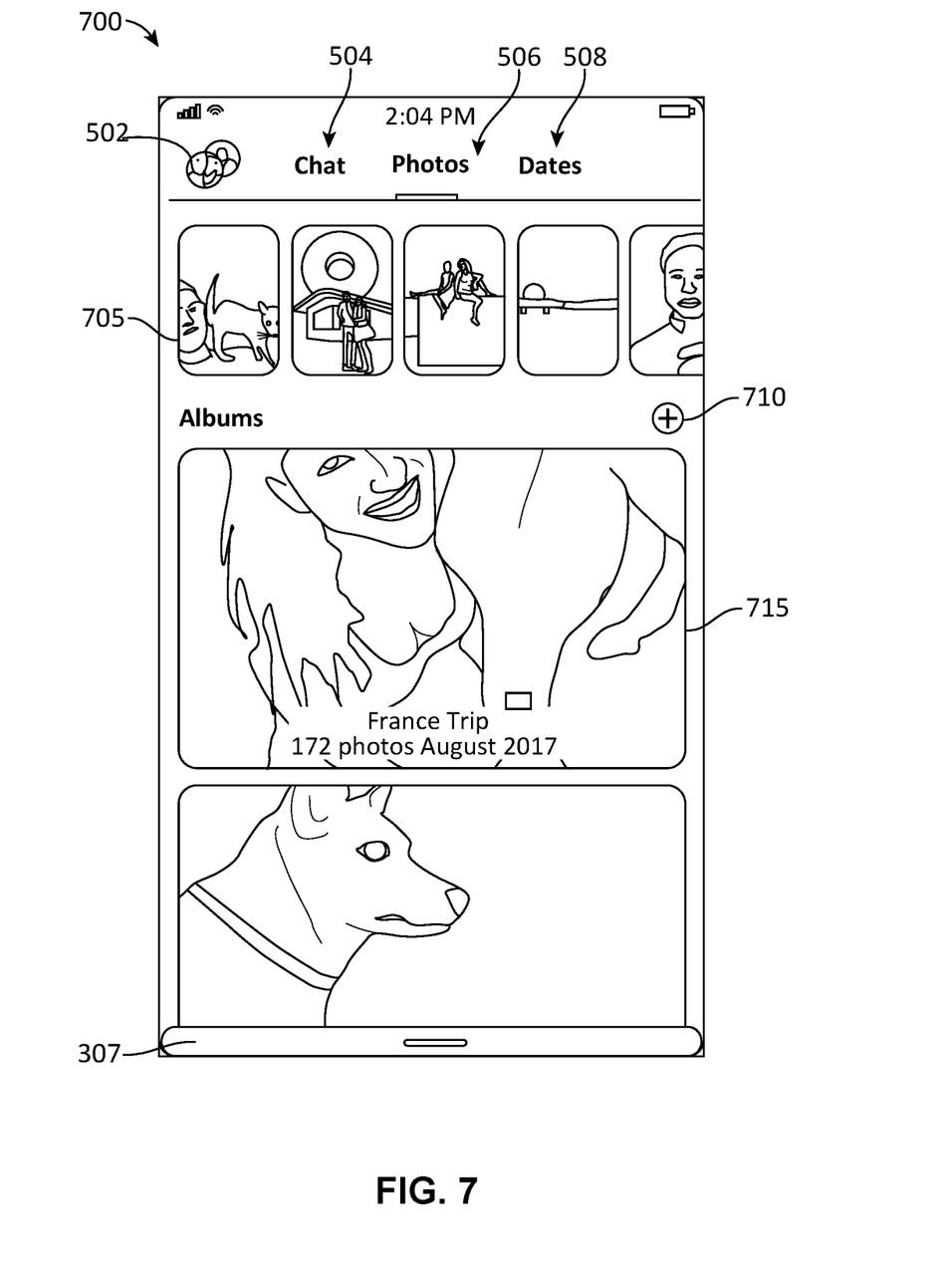
FIG. 7 illustrates an example photos interface in the private space, according to one embodiment.

FIG. 7 illustrates one embodiment of the photos interface 700. The photos interface 700 is an interface in which the social networking system 140 collects and displays photos associated with the two or more users with access to the private space 405. In the photos interface, users can view all photos 705 associated with the users of the private space.

The photos interface module 235 can prepopulate the photos interface 700 with photos of the users of the private space. In one embodiment, photos are added to the photos interface 700 when photos displayed in the first user interface 310 are associated with the users based on the social networking system's tagging system. In various embodiments, photos are displayed when a photo includes tags for all users with access to the private space 405, photos where one user uploads one or more photos to the social application and tags the other users associated with the private space 405, photos associated with the users of the private space 405 using social and profile data, and content items that mention the users of the private space and include photos (e.g., birthday and anniversary posts), etc. These photos can be collected from newsfeeds of users of the private space, from user profile pages of the users, from photos posted in messaging applications associated with the social application, etc. The system can also collect photos from any of these locations using facial recognition techniques to recognize the faces of the users from the private space. In some embodiments, the photos interface 700 displays photos in albums 715 using photo data. Examples of photo data includes metadata, abstract data, and contextual data, or any text posted with the photo by the user that posted it, or comments posted by other users on the photo. So that the photos interface 700 has some initial photo content, the system can pre-populate the interface upon its creation with photos the system has collected for the users of the private space. The system can also offer pre-population as an option that the users can either select or opt instead to populate themselves. The system can continue to populate the photos interface 700 with photos posted in the private space, in the first user interface, or both (or based on the users' selection of which photos should be included in the interface 700).

Users can directly upload photos to the photos interface 700. In one embodiment, users can upload individual photos 705 using a photo add element 710 to the photos interface 700. In one embodiment, users can use the photos interface to organize photos displayed in the photos interface into albums 715. In another embodiment, users can directly upload photo albums 715 to the photos interface 700. Albums 715 can be associated with a particular event, time period, or theme. Examples include holidays, anniversaries, trips, and life cycle events.

Photos are added to the photos interface 700 when a user uploads one or more photos to the chat interface 600. In one embodiment, photos displayed in the chat interface 600 are automatically stored and displayed in the photos interface 700. In another embodiment, users select which photos uploaded to the chat interface 600 are displayed in the photos interface 700.

Figure 8:
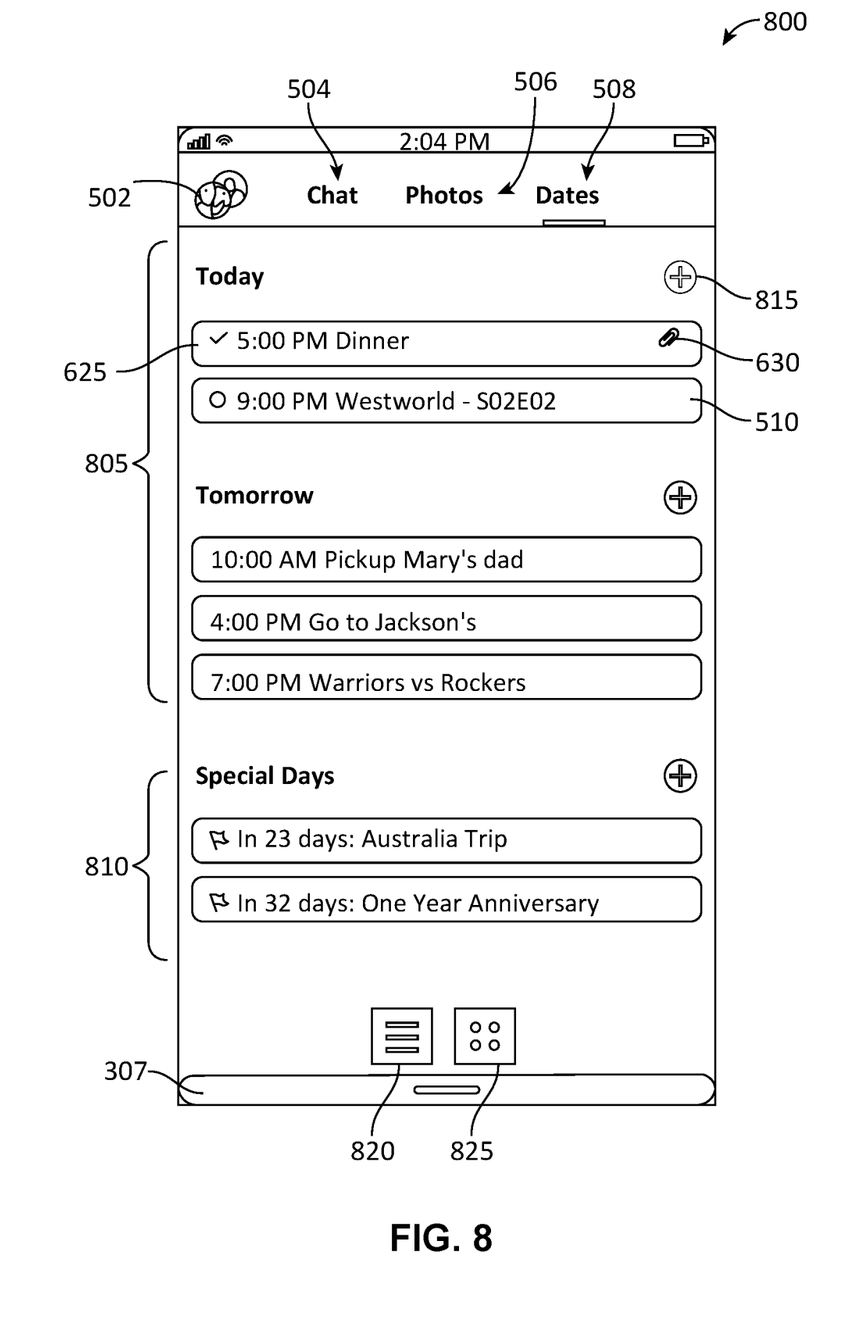
FIG. 8 illustrates an example dates interface in the private space, according to one embodiment.

FIG. 8 illustrates one embodiment of the dates interface 800. The dates interface 800 is an interface in which the social networking system collects and displays dates associated with users of the private space 405. There can be one or more categories of dates displayed in the dates interface, including categories for upcoming events 805 and special days 810. In one embodiment, upcoming events 805 include events that will occur within the next few days. Examples include upcoming day-to-day tasks, date nights, and errands the one or more users are participating in.

The special days category 810 provides users with reminders of milestones farther out in advance than other events and dates. Events added to the special days category 810 are events associated with milestones in the users' relationship, according to one embodiment. Examples include anniversaries, trips, birthdays, and the like.

Users can create dates and events within the dates interface using an add date element 815. In another embodiment, dates and events 625 generated in the chat interface 600 are added to the dates interface 800. Examples include arranging a time for dinner, grocery shopping, or a get-together. In one embodiment, when a list 630 associated with an event is created in the chat interface, the list 630 is made accessible in the dates interface 800 under the event 625. In another embodiment, the social networking system provides users with a method of generating lists directly in the dates interface.

In one embodiment, events are collected from the first user interface 310 when users with access to the private space respond the event. Examples include responding to an event hosted by another user or another entity on the social application 510 (e.g., sports teams, TV shows, universities). In another embodiment, events associated with an entity that the users follow, but to which the users have not explicitly responded to, are added to the dates interface 800. Examples include TV show airings and sports events associated with entities all users with access to the private space follow.

Users can modify how events are displayed in the dates interface 800. In one embodiment, users toggle between a list view of the events 820 and a calendar view of the events 825. As with the photos interface 700, the dates interface 800 can be pre-populated with certain events upon creation of the private space, including events collected automatically by the system from a calendar or other date listing in the first user interface or from other separate calendars used by the users.

Notifications

Figure 9:
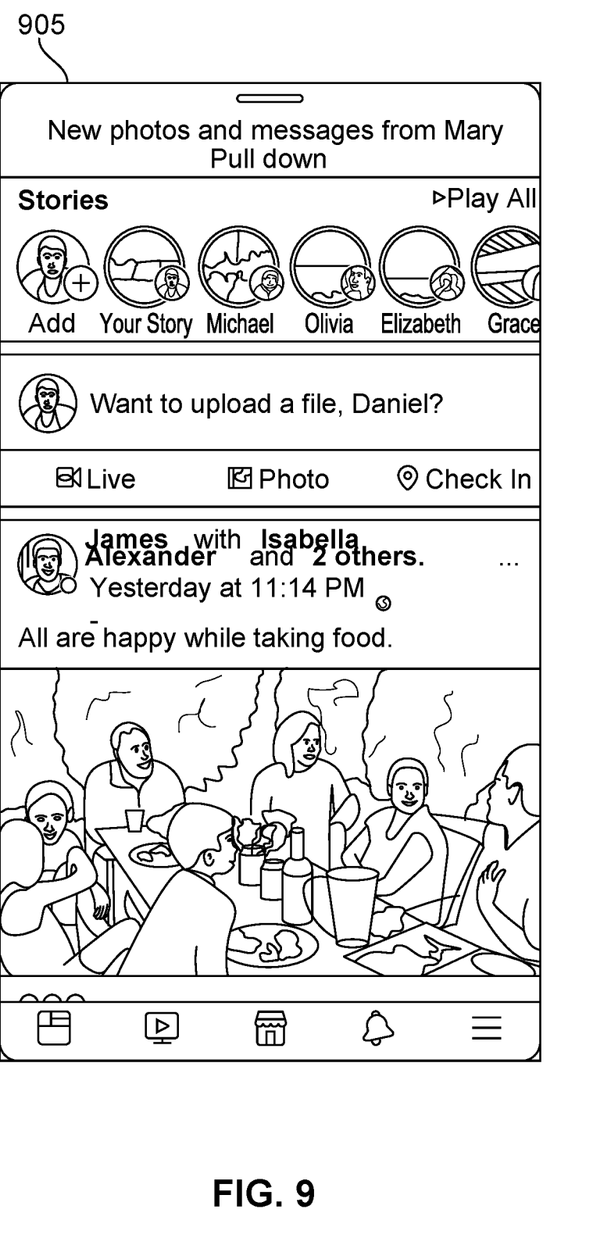
FIG. 9 illustrates an example interface associated with notifying a user that a content item has been created in the private space, according to one embodiment.

Users of a private space can also receive notifications of posts by the other user in either the private space or the first user interface. FIG. 9 illustrates one embodiment of the social networking system displaying a notification 905 in the first user interface to the first user that the second user has created a content item within the private space. The notification is provided to facilitate immediate response to the content item and easy communication between the first and second users. In one embodiment, when a user selects the notification, he or she is automatically directed to the interaction in the private space. In another embodiment, users are directed to the homepage interface 405 of the private space. Similarly, users can receive notifications in the private space that the other user has posted a content item in the first user interface. This can show up in the chat interface as mentioned above, or can appear as a banner or any other format of notification in the private space, similar to the FIG. 9 example.

Methods

Figure 10:
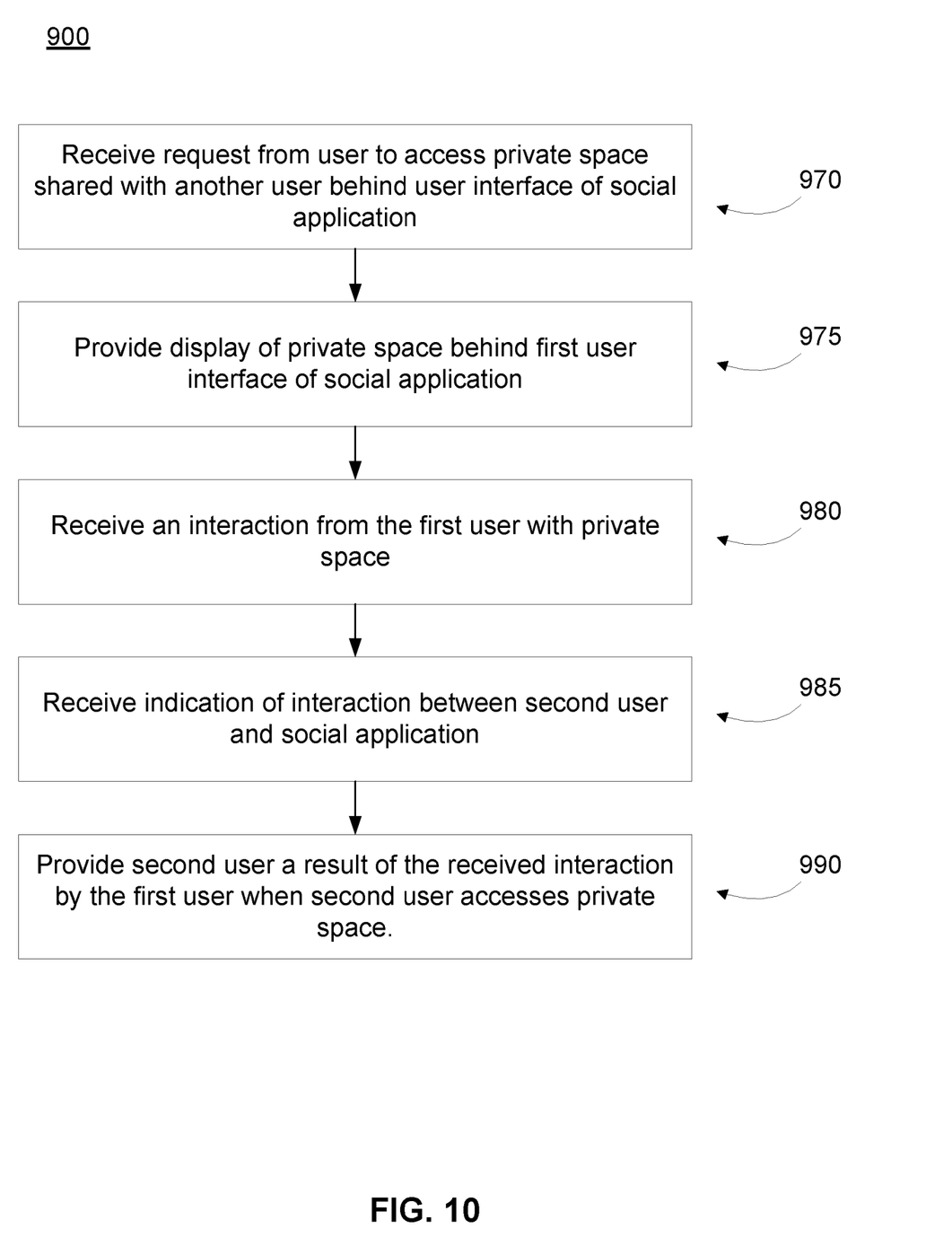
FIG. 10 shows a flowchart that illustrates a method associated with interactions between users in a private space, according to one embodiment.

FIG. 10 illustrates an example method 900 associated with providing a notification to a user that another user has interacted with a private space 405. The social networking system receives a request 970 from the first user to access the private space 405 hidden behind the first user interface 310. This request can be the user swiping an access element to reveal the hidden private space. Or the user could select an icon in the first user interface that is for accessing the private space.

The social networking system displays 975 the private space to the first user in response to the user's request. If the user swipes an access element, for example, this system can move the first user interface away to reveal the private space.

The social networking system receives an interaction 980 between the first user and the private space 405. In one embodiment, interactions include interactions associated with the homepage interface 500, the chat interface 600, the photos interface 700, or the dates interface 800. For example, the first user may send a message on the chat interface, post a new photo, add a new event, etc.

The social networking system receives an indication 985 of an interaction between the second user and the social application. This could be an action to access the private space by swiping an access element or other action, such as a new post of content within the social application.

The social networking systems notifies or displays 990 to the second user associated with private space the interaction between the first user and the private space 405. For example, the system can display the result of the first user's interaction with the private space to the second user within the private space. Thus, the second user can see the message that the first user posted in the chat interface, or the photo the first user posted in the photos interface, or the new event that first user added to the dates interface. As another example, the display could be a display of a notification to the second user within the first user interface that the first user has taken an action in the private space. The second user might select the notification to view this new action taken in the private space by the first user.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    storing, at an online system, connections between users of the online system;
    receiving, at the online system, from a first user of a plurality of users of the online system a change in a status of the first user maintained by the online system to indicate that a connection between the first user and a second user of the plurality of users stored by the online system indicates the first user and the second user are in a designated relationship;
    receiving, at the online system, an indication from the second user that the connection between the first user and the second user stored by the online system from the change in the status of the first user maintained by the online system indicates the first user and the second user are in the designated relationship;
    generating, at the online system, a private space shared by a first user and a second user of a plurality of users of the online system, in response to the online system receiving the change in the status of the first user maintained by the online system and receiving the indication from the second user;
    receiving indication of an action taken on a social application, by the first user of the plurality of users to access the private space shared with the second user from the plurality of users, the action comprising an instruction to hide at least a portion of a first user interface of the social application in order to access a second user interface of the private space behind the first user interface;
    in response to the action, providing for display to the first user the private space behind the first user interface of the social application, the private space comprising two or more of the following:
        a homepage interface displaying a plurality of actions the first user can take to interact with the second user,
        a chat interface displaying private messages between the first and second users,
        a photos interface displaying photos associated with both the first and second users, and
        a dates interface displaying a calendar of dates and events shared by the first and second users;
    receiving an interaction by the first user with the homepage interface, chat interface, photos interface, or dates interface;
    receiving an indication of an action taken on the social application by the second user to access the private space; and
    providing for display to the second user within the private space a result of the received interaction by the first user.

2. The method of claim 1, wherein the received interaction comprises an interaction with the homepage interface, and wherein the interaction comprises selecting a call user interface element to call the second user, selecting a video call user interface element to video call the second user, and selecting a reaction user interface element to indicate affection to the second user.

3. The method of claim 1, wherein the received interaction comprises an interaction with the chat interface, and wherein the chat interface provides for display to the first user, while the first user is interacting with the chat interface, a notification that informs the first user that the second user created a content item in the first user interface of the social application.

4. The method of claim 1, wherein the received interaction comprises an interaction with the chat interface in which the first user creates one or more content items indicating a date, and in response, the date is automatically added to the dates interface as a new calendar item for the first and second users.

5. The method of claim 1, wherein the received interaction comprises an interaction with the photos interface, and wherein the interaction results in display of photos in the photos interface that have been collected in the social application based on tags on photos posted in the social application including both the first and second users and based on photos posted within the private space by either of the first and second users.

6. The method of claim 1, further comprising tracking and updating the calendar in the dates interface over time with dates and events relevant to the first and second users.

7. The method of claim 1, wherein the received interaction comprises an interaction with the homepage interface, and wherein the interaction comprises selecting one or more upcoming dates or events shared by the first and second users, and in response, the first user is directed to the dates interface.

8. The method of claim 1, wherein the received interaction comprises an interaction with the chat interface, and wherein the interaction comprises uploading one or more photos, and in response, the one or more photos are automatically added to the photos interface.

9. The method of claim 1, further comprising collecting dates from the first interface based on posts of content items relating to the first or second user on the first user interface, and automatically adding these dates to the dates interface.

10. The method of claim 1, further comprising:
receiving an indication of an action taken by the first user on the social application on the first user interface;
receiving an interaction by the second user with the private space;
providing for display to the first user, while the first user is interacting with the first user interface, a notification that informs the first user that the second user interacted with the private space.

11. The method of claim 1, wherein the received interaction comprises an interaction with the chat interface in which the first user creates one or more content items indicating a list associated with a date, and in response, the list is automatically added to the associated date on the dates interface.

12. A computer program product comprising a non-transitory computer-readable storage medium containing computer program code for:
storing, at an online system, connections between users of the online system;
receiving, at the online system, from a first user of a plurality of users of the online system a change in a status of the first user maintained by the online system to indicate that a connection between the first user and a second user of the plurality of users stored by the online system indicates the first user and the second user are in a designated relationship;
receiving, at the online system, an indication from the second user that the connection between the first user and the second user stored by the online system from the change in the status of the first user maintained by the online system indicates the first user and the second user are in the designated relationship;
generating, at the online system, a private space shared by a first user and a second user of a plurality of users of the online system, in response to the online system receiving the change in the status of the first user maintained by the online system and receiving the indication from the second user;
receiving indication of an action taken on a social application, by the first user of a plurality of users to access a private space shared with the second user from the plurality of users, the action comprising an instruction to hide at least a portion of a first user interface of the social application in order to access a second user interface of the private space behind the first user interface;
in response to the action, providing for display to the first user the private space behind the first user interface of the social application, the private space comprising two or more of the following:
a homepage interface displaying a plurality of actions the first user can take to interact with the second user,
a chat interface displaying private messages between the first and second users,
a photos interface displaying photos associated with both the first and second users, and
a dates interface displaying a calendar of dates and events shared by the first and second users;
receiving an interaction by the first user with the homepage interface, chat interface, photos interface, or dates interface;

receiving an indication of an action taken on the social application by the second user to access the private space; and
providing for display to the second user within the private space a result of the received interaction by the first user.

13. The computer program product of claim 12, wherein the received interaction comprises an interaction with the chat interface, and wherein the chat interface provides for display to the first user, while the first user is interacting with the chat interface, a notification that informs the first user that the second user created a content item in the first user interface of the social application.

14. The computer program product of claim 12, wherein the received interaction comprises an interaction with the chat interface in which the first user creates one or more content items indicating a date, and in response, the date is automatically added to the dates interface as a new calendar item for the first and second users.

15. The computer program product of claim 12, wherein the received interaction comprises an interaction with the photos interface, and wherein the interaction results in display of photos in the photos interface that have been collected in the social application based on tags on photos posted in the social application including both the first and second users and based on photos posted within the private space by either of the first and second users.

16. The computer program product of claim 12, further comprising computer program code for:
receiving an indication of an action taken by the first user on the social application on the first user interface;
receiving an interaction by the second user with the private space; providing for display to the first user, while the first user is interacting with the first user interface, a notification that informs the first user that the second user interacted with the private space.

17. A system comprising:
a processor;
a non-transitory computer-readable medium containing instructions for execution by the processor, the instructions causing the processor to perform steps of:
storing, at an online system, connections between users of the online system;
receiving, at the online system, from a first user of a plurality of users of the online system a change in a status of the first user maintained by the online system to indicate that a connection between the first user and a second user of the plurality of users stored by the online system indicates the first user and the second user are in a designated relationship;
receiving, at the online system, an indication from the second user that the connection between the first user and the second user stored by the online system from the change in the status of the first user maintained by the online system indicates the first user and the second user are in the designated relationship;
generating, at the online system, a private space shared by a first user and a second user of a plurality of users of the online system, in response to the online system receiving the change in the status of the first user maintained by the online system and receiving the indication from the second user;
receiving indication of an action taken on a social application, by the first user of the plurality of users to access a private space shared with the second user from the plurality of users, the action comprising an instruction to hide at least a portion of a first user interface of the social application in order to access a second user interface of the private space behind the first user interface;

in response to the action, providing for display to the first user the private space behind the first user interface of the social application, the private space comprising two or more of the following:
- a homepage interface displaying a plurality of actions the first user can take to interact with the second user,
- a chat interface displaying private messages between the first and second users,
- a photos interface displaying photos associated with both the first and second users, and
- a dates interface displaying a calendar of dates and events shared by the first and second users;

receiving an interaction by the first user with the homepage interface, chat interface, photos interface, or dates interface;

receiving an indication of an action taken on the social application by the second user to access the private space; and providing for display to the second user within the private space a result of the received interaction by the first user.

18. The system of claim 17, wherein the received interaction comprises an interaction with the chat interface, and wherein the chat interface provides for display to the first user, while the first user is interacting with the chat interface, a notification that informs the first user that the second user created a content item in the first user interface of the social application.

19. The system of claim 17, wherein the received interaction comprises an interaction with the chat interface in which the first user creates one or more content items indicating a date, and in response, the date is automatically added to the dates interface as a new calendar item for the first and second users.

20. The system of claim 17, wherein the received interaction comprises an interaction with the photos interface, and wherein the interaction results in display of photos in the photos interface that have been collected in the social application based on tags on photos posted in the social application including both the first and second users and based on photos posted within the private space by either of the first and second users.

* * * * *